J. MIZNER.
Rope-Holder.
No. 204,838. Patented June 11, 1878.
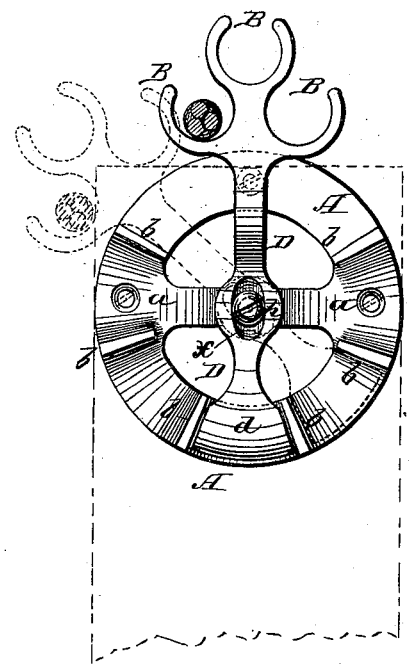
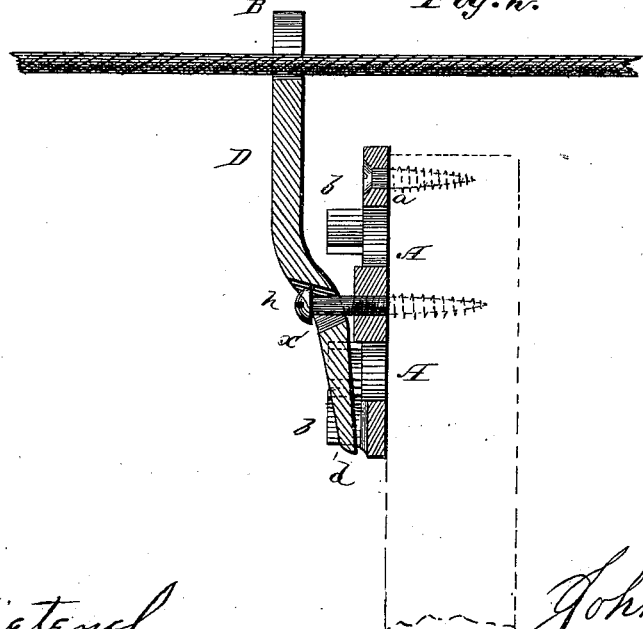

UNITED STATES PATENT OFFICE.

JOHN MIZNER, OF GRAND RAPIDS, MICHIGAN.

IMPROVEMENT IN ROPE-HOLDERS.

Specification forming part of Letters Patent No. 204,838, dated June 11, 1878; application filed December 1, 1877.

*To all whom it may concern:*

Be it known that I, JOHN MIZNER, of Grand Rapids, in the county of Kent and State of Michigan, have invented certain new and useful Improvements in Rope-Holders; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a line and rope holder, as will be hereinafter more fully set forth.

In the annexed drawing, to which reference is made, and which fully illustrates my invention, Figure 1 is a front view of my line and rope holder, and Fig. 2 is a central vertical section of the same.

A represents a circular disk, of any suitable dimensions, provided with three or more holes for the passage of screws or nails $a$, to fasten the disk to the object desired. Upon the rim of the disk A, on the outer surface, is a series of radial flanges, $b\ b$, forming tapering notches or recesses, for the purpose of holding the tapering end $d$ of the lever D, so that said lever cannot move out of place, though it is left free to turn in any direction to hold the line at any angle. The long end of the lever D is provided with three or more prongs, B B, for the purpose of attaching as many lines as may be desired.

The hole $x$ through the lever for the passage of the bolt or screw $h$, to secure it to the disk A, is cut oblong to allow of the clamping of the rope or line.

It will readily be seen that the lever D can be quickly released and turned at any angle desired, and then fastened again by slipping the tapering or wedge piece $d$ of the lever into another notch or recess formed by flanges $d$.

Having thus fully described my invention, what I claim as new, and desire to secure by Letters Patent, is—

1. The disk A, formed with radial ribs $b$, forming a series of tapering notches or recesses, in combination with a lever, pivoted in the center of the disk, and formed at one end with a tapering or wedge piece, $d$, for the purposes herein set forth.

2. The lever D, provided at one end with prongs B, and at the other end with the wedge $d$, in combination with the disk A, provided with radial ribs $b$, all substantially as and for the purposes herein set forth.

In testimony that I claim the foregoing as my own I have hereto affixed my signature in presence of two witnesses.

JOHN MIZNER.

Witnesses:
   W. G. SAUNDERS,
   H. G. SAUNDERS.